United States Patent
Hsu et al.

(10) Patent No.: US 8,219,041 B2
(45) Date of Patent: *Jul. 10, 2012

(54) DESIGN STRUCTURE FOR TRANSMITTER BANDWIDTH OPTIMIZATION CIRCUIT

(75) Inventors: Louis L. Hsu, Fishkill, NY (US); Hayden C. Cranford, Jr., Cary, NC (US); Joseph Natonio, Wappingers Falls, NY (US); James D. Rockrohr, Hopewell Junction, NY (US); Huihao Xu, Brooklyn, NY (US); Steven J. Zier, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 980 days.

This patent is subject to a terminal disclaimer.

(21) Appl. No.: 11/985,963

(22) Filed: Nov. 19, 2007

(65) Prior Publication Data

US 2009/0129485 A1    May 21, 2009

(51) Int. Cl.
    *H04B 1/02*    (2006.01)
(52) U.S. Cl. .................................. 455/91; 455/569.2
(58) Field of Classification Search .................. 455/91
    See application file for complete search history.

(56) References Cited

U.S. PATENT DOCUMENTS

| | | | |
|---|---|---|---|
| 4,110,692 A * | 8/1978 | Pradal ............................ | 455/110 |
| 6,272,360 B1 * | 8/2001 | Yamaguchi et al. ........ | 455/569.2 |
| 6,483,764 B2 | 11/2002 | Chen Hsu et al. | |
| 6,774,717 B2 * | 8/2004 | Hellberg .................... | 330/124 R |
| 6,876,250 B2 | 4/2005 | Hsu et al. | |
| 6,937,054 B2 | 8/2005 | Hsu et al. | |
| 6,975,140 B2 | 12/2005 | Hsu et al. | |
| 6,980,824 B2 | 12/2005 | Hsu et al. | |
| 7,081,842 B2 | 7/2006 | Cranford, Jr. et al. | |
| 2004/0014438 A1 * | 1/2004 | Hasarchi ....................... | 455/119 |
| 2006/0255860 A1 * | 11/2006 | Moussavi ...................... | 330/278 |
| 2008/0316051 A1 * | 12/2008 | Salser et al. ............. | 340/870.02 |

OTHER PUBLICATIONS

C.J. Liang et al. "NetComposer-II: High performance Structure ASIC Programmable NPU Platform for Layer 4-7 Applications" (date unknown).
Faraday Technology Corp., "Faraday Announces Highly-Integrated Programmable SerDes-Based Communication Platform ASIC," (Oct. 3, 2006).
Faraday Technology Corp., "Faraday Unveils Universal Programmable SerDes IP," (Nov. 7, 2006).
Lattice Semiconductor Corp., "Lattice Semiconductor Extends Programmable SERDES Leadership With Introduction of 4 Channel Field Programmable System Chip Device,"(Apr. 14, 2003).

* cited by examiner

*Primary Examiner* — Duc Nguyen
*Assistant Examiner* — Ajibola Akinyemi
(74) *Attorney, Agent, or Firm* — Yuanmin Cai

(57) ABSTRACT

A design structure embodied in a machine-readable medium used in a design process provides a transmitter having a frequency response controllable in accordance with an operational parameter, and may include a storage operable to store operational parameters for controlling a frequency response of the transmitter under each of a plurality of corresponding operating conditions. A sensor can be used to detect an operating condition. In response to a change in the detected operating condition, a stored operational parameter corresponding to the detected operating condition can be used to control the frequency response of the transmitter.

4 Claims, 7 Drawing Sheets

| CIRCUIT PARAMETERS | TEMPERATURE #1 | TEMPERATURE #2 | TEMPERATURE #m |
|---|---|---|---|
| SUPPLY VOLTAGE #1 | PARAMETER SET <1,1> | PARAMETER SET <1,2>  250 | PARAMETER SET <1,m>  254 |
| SUPPLY VOLTAGE #2 | PARAMETER SET <2,1> | PARAMETER SET <2,2>  252 | PARAMETER SET <2,m> |
| SUPPLY VOLTAGE #n | PARAMETER SET <n,1> | PARAMETER SET <n,2> | PARAMETER SET <n,m> |

DESIGN STRUCTURE FOR TRANSMITTER BANDWIDTH OPTIMIZATION CIRCUIT

BACKGROUND OF THE INVENTION

The present invention relates to microelectronic transmitters, particularly to their structure and operation.

High-speed microelectronic serial data transmitters can transmit at rates of multiple gigabits per second (Gbs) and even tens of Gbs. Such high-speed serial transmitters typically are implemented on microelectronic elements, e.g., semiconductor chips, with several transmitters implemented on each microelectronic element.

The bandwidth of a transmitter refers to a range of frequencies for which the output of the transmitter has about the same amplitude. Ideally, the bandwidth of a serial data transmitter should stay constant throughout the range of operating conditions that the transmitter encounters. Maintaining bandwidth helps to reduce energy consumption and can reduce cross-talk noise between adjacent transmitters on the same microelectronic element.

Sometimes, a transmitter design is required to accommodate different customer specifications with a wide range of data rates. A one-design-fits-all practice has become a norm for the semiconductor industry to save design cost. However, transmitters designed this way can sometimes have difficulty meeting the bandwidth requirements for transmission at the highest data transmission rates.

FIG. 1 contains Bode plots (curves) illustrating an amplitude versus frequency response of a prior art serial transmitter under different operating conditions. Curve 10 is a graph illustrating nearly ideal amplitude versus frequency response for the transmitter. In this case, the amplitude is fairly constant at amplitude a0 in the frequency range f0 to $f_{max}$. The frequency response exhibited by curve 10 will result under a fairly narrow range of operating conditions, such as when the temperature of the microelectronic element and the voltage level of the power supply voltage supplied to the transmitter are close to ideal. Unfortunately, operating conditions, including temperature and power supply voltage level are frequently at levels which are not close to ideal. The temperature may vary between subzero temperatures upon powering up the transmitter in cold locations to over 100 degrees C. in some densely packed environments. The power supply voltage level may also vary, for example, between 1.0 V and 2.5 V (by as much as 150%). Curve 12 illustrates a frequency response of the transmitter under different, non-ideal operating conditions, for example, when temperature is elevated and the power supply voltage level is decreased. As illustrated by curve 12, the frequency response under the non-ideal operating conditions worsens. The amplitude rolls off (decreases) at a lower frequency ($f_R$) than $f_{max}$, such that bandwidth under the non-ideal operating conditions is impacted. At frequency $f_{max}$ of the curve 12, the amplitude has already fallen from the initial amplitude a1 to a decreased amplitude a2, for a total decrease in amplitude of Δa. It is difficult, if not impossible, to design a serial data transmitter which has satisfactory frequency response under the different extremes of operating conditions.

SUMMARY OF THE INVENTION

In accordance with one aspect of the invention, a design structure, embodied in a machine-readable medium used in a design process. The design structure can include a transmitter having a frequency response controllable in accordance with an operational parameter. The design structure may include storage, which can include, for example, non-volatile memory, or a plurality of fusible links. The storage may be usable to store operational parameters for controlling a frequency response of the transmitter under each of a plurality of corresponding operating conditions. The design structure may also include a sensor operable to detect at least one operating condition. A plurality of sensors may be provided, for example, for detecting temperatures and power supply voltages at locations on the microelectronic element. The design structure may further include a control circuit which is operable in response to a change in a detected operating condition to use a stored operational parameter corresponding to the detected operating condition to control the frequency response of the transmitter.

DETAILED DESCRIPTION

Commonly owned U.S. patent application Ser. No. 11/769,128 filed Jun. 17, 2007 to Louis L. Hsu et al. entitled "Transmitter Bandwidth Optimization Circuit" is incorporated by reference herein. In general, in today's manufacturing environment, from lot to lot or even from chip to chip, an acceptable process tolerance is assumed. The resulting chip may experience a distribution in process parameters (also called "P" factor) such as gate dimensions, gate dielectric thickness, threshold levels, line widths, distance to shallow trench isolation, overlay, misalignment, etc. As the devices approaching 65 nanometers (nm) and beyond, the leakage through the gate dielectric will aggravate the process variation. A precision analog circuit must be able to calibrate out such P-related variation so that DC offset due to device mismatch can be eliminated. The on-chip power supply voltage can also vary (also called "V" factor). Even if the power supply voltage level set at a known level, it could also vary due to aging, resistive ("IR") drop, leakage or power disruption. A calibration method is needed which can compensate for P related variations Finally, circuit behavior is influenced by on-chip temperature variation, as mentioned earlier, called T-factor. In accordance with an embodiment of the invention, a precision transmitter can be achieved which is tolerant to real-life PVT variation.

Figure 2A:
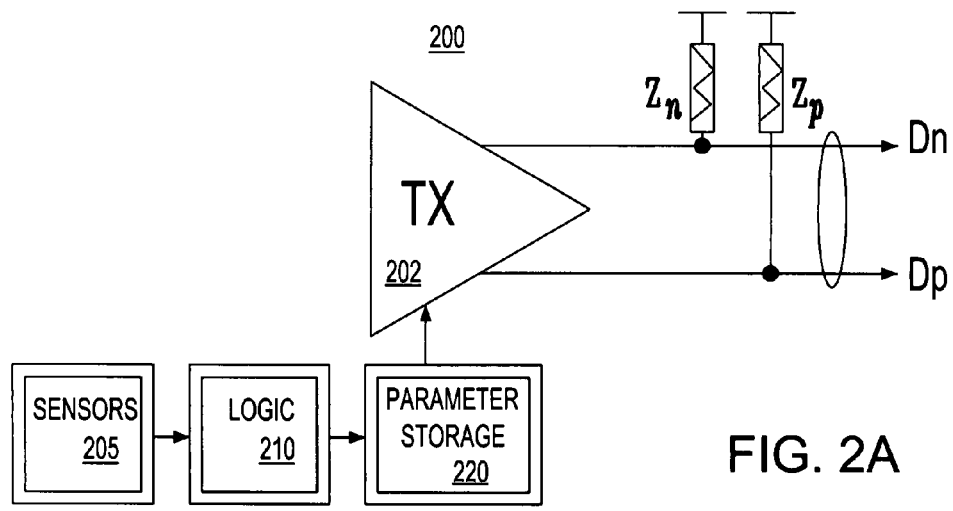
FIG. 2A is a block and schematic diagram illustrating a microelectronic transmitter in accordance with an embodiment of the invention.

FIG. 2A illustrates a microelectronic element 200 including a transmitter 202 in accordance with an embodiment of the invention. The transmitter 202 typically is a serial data transmitter which outputs a data signal as a pair of differential signals Dn and Dp on a pair of transmission lines terminated by termination impedances Zn and Zp. The microelectronic element 200 includes a system operable to control the frequency response of the transmitter 202. Illustratively, as shown in FIG. 2A, such system includes sensors 205 which are operatively coupled to logic circuits 210, the logic circuits further being coupled to parameter storage 220, which in turn, is coupled to the transmitter 202. The parameter storage 220 is operable to store a plurality of operational parameters for controlling a frequency response of the transmitter under various operating conditions. Temperature and power supply voltage level are among the operating conditions which can vary during operation of the microelectronic element. The length of a cable to which the transmitter 202 is connected is another operating condition which can vary and affect the frequency response of the transmitter. The data transmission rate at which the transmitter is operated can be another operating condition for which control over the frequency response is desired. For example, in a case where the transmitter is operated at a lower data transmission rate, the frequency response may improve if amplitude is increased at a lower frequency, but allowed to roll off at a decreased maximum frequency. Another operating condition that can vary and affect frequency response relates to whether the transmitter is coupled to the receiver in an AC-coupled manner or a DC-coupled manner. The distance between adjacent transmitters on the microelectronic element is yet another variable which, like other operating conditions, can affect the frequency response and for which corresponding operational parameters can be stored.

Figure 1:
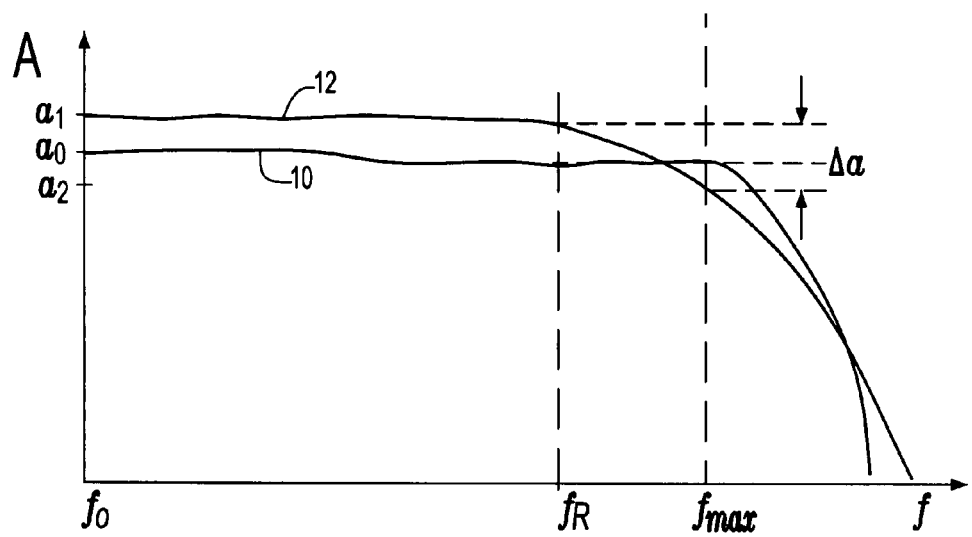
FIG. 1 is a Bode plot graph illustrating differences in frequency responses for a prior art transmitter.

In accordance with an embodiment of the invention, the system is operable to retrieve and use the operational parameters stored in the storage 220 to control operation of the transmitter to obtain good frequency response and bandwidth at a plurality of different operating conditions. Using the stored parameters, the frequency response of the transmitter 202 is controlled so that it more closely resembles the curve 10 (FIG. 1; ideal frequency response), despite changes in the operating conditions such as temperature, power supply voltage level or cable length. Moreover, operational parameters can be stored which can be used to compensate for design-level changes such as the spacing between adjacent transmitters.

Figures 2B, 3:
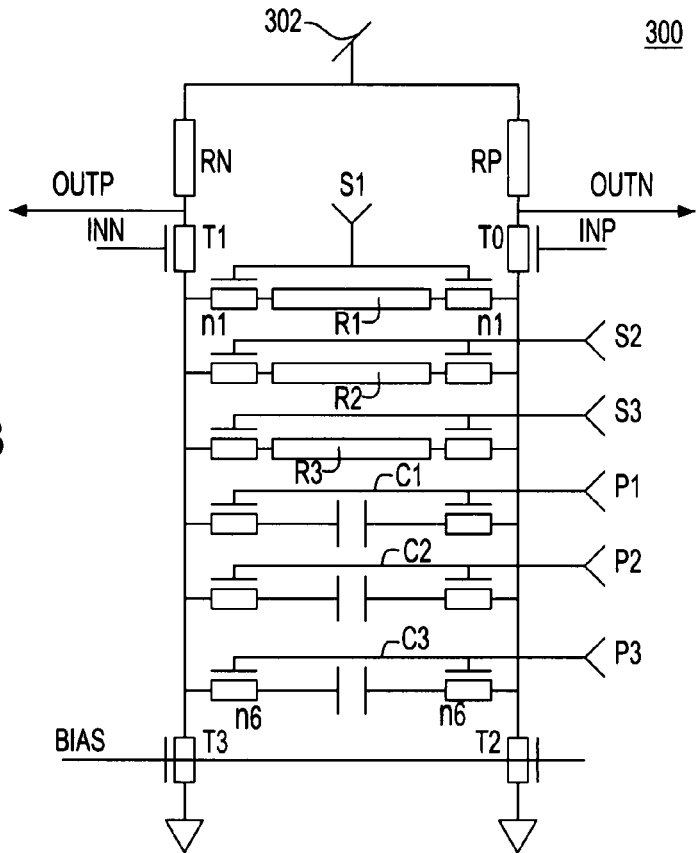
FIG. 2B is a table illustrating a set of stored operational parameters for each of an n×m matrix of operating conditions.
FIG. 3 is a schematic diagram illustrating a programmable peaking amplifier.

FIG. 2B is a chart illustrating an n×m matrix (the numbers n and m may be different) of operational parameters for controlling the transmitter under different temperature and power supply voltage operating conditions. For each supply voltage value of a set of supply voltage values and each temperature value of a set of temperature values, there is an operational parameter for use in controlling the operation of the transmitter. In one example, the supply voltage provided to the transmitter can vary between 1.0 V and 2.5 V. The temperature of the microelectronic element can vary between 0 and 100 degrees C. The n×m matrix provides operational parameters for controlling the frequency response of the transmitter under each of the different operating conditions defined by the combination of the supply voltage level and the temperature. Within the matrix, operational parameters can be stored, for example, for temperature gradations of 10° C. and gradations in the power supply voltage of 100 mV.

Therefore, when the supply voltage has a first value, e.g., 1.0 V, and the temperature of the microelectronic element has a value of temperature #2, e.g., 10° C., then, the matrix contains an operational parameter 250 for controlling the transmitter under those operating conditions to obtain good frequency response. When the supply voltage is one gradation higher but the temperature is the same, a different operational parameter 252 is used to control the operation of the transmitter. Alternatively, when the temperature is one gradation higher but the supply voltage is the same, another operational parameter 254 is used to control the operation of the transmitter.

In operation, sensors 205 detect values of operating conditions which affect the microelectronic element, for example, a temperature of the microelectronic element and a level of the power supply voltage supplied to the microelectronic element. The detected values are provided to logic circuit 210 which then determines whether the operating conditions have changed since the time of last reading. If the logic circuits 210 detect no change in the operating conditions, the transmitter 202 continues to operate with previously applied operational parameters controlling its frequency response. However, when the logic circuits 210 detect a change, corresponding operational parameters are retrieved from storage 220 and applied to control the operation of the transmitter 202.

Figure 8:
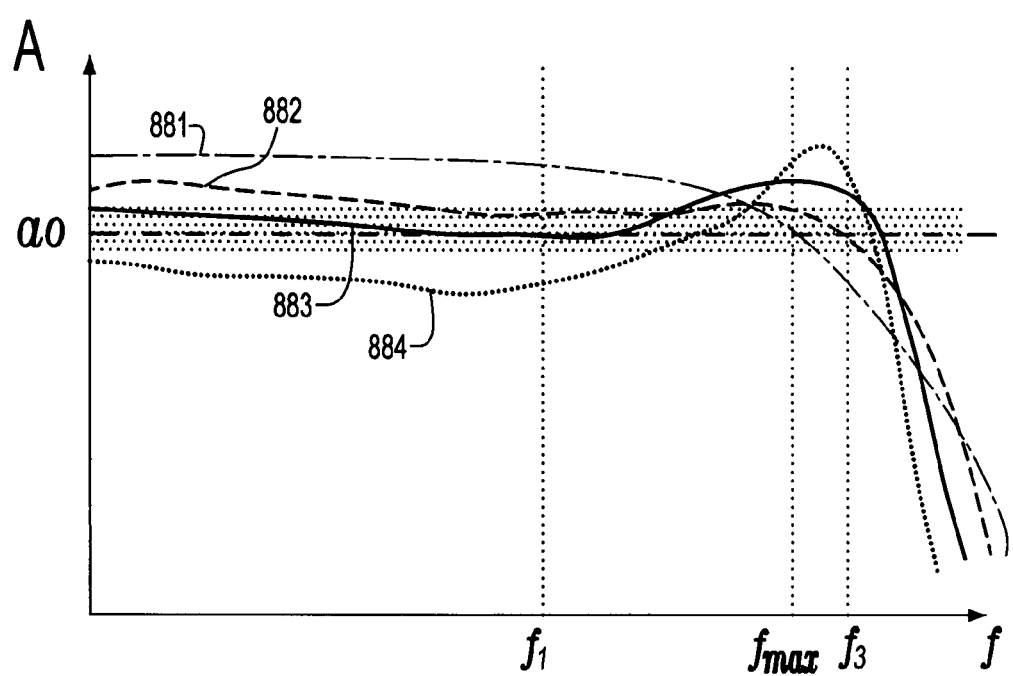
FIG. 8 is a Bode plot graph further illustrating a calibration method of operation in accordance with an embodiment of the invention.

The transmitter 202 requires circuitry which has a controllable frequency response. A programmable peaking amplifier 300 (FIG. 3) is an example of such circuit. The peaking amplifier 300 can be controlled as an in-line amplifier in the differential data transmitter 202 (FIG. 2A) to obtain desired frequency response over the operating bandwidth of the transmitter. A "peaked" frequency response exhibits increased amplitude at a particular frequency. Curves 883 and 884 (FIG. 8), discussed below, exhibit peaked frequency response. Peaked frequency response is contrasted with non-peaked frequency response, as exemplified by curve 881 (FIG. 8). The programmable peaking amplifier 300 includes elements which cause its frequency response to be more like the non-peaked frequency response at lower frequencies and to be more like the peaked frequency response curve when close to the highest output frequency $f_{max}$. In such way, the frequency response appears similar to the ideal frequency response curve 10 shown in FIG. 1.

To achieve such frequency response, the peaking amplifier 300 includes both non-peaking load elements and peaking load elements. Non-peaking load elements include resistive loads RN and RP operable to generate output signals OUTP and OUTN, respectively. Each of the output signals OUTP and OUTN swings by a resistive voltage drop from the supply voltage 302 in response to input signals INN and INP applied to input transistors T1 and T2. Peaking load elements include shunt resistors R1, R2 and R3 and shunt capacitors C1, C2 and C3. The shunt resistors and shunt capacitors have different resistance values and capacitance values. The shunt resistors and shunt capacitors can be switched into the peaking amplifier circuit and switched out by a set of digital control signals s1, s2, s3, s4, s5 and s6 applied to pairs of switching devices, e.g., a pair of devices n1 . . . to the pair of devices n6. In this way, the peaked frequency response of the peaking amplifier can be varied in accordance with the control signals s1, s2, s3, s4, s5 and s6.

The operational parameters stored in the parameter storage 220 (FIG. 2A) are used to control the values of the digital control signals s1, s2, s3, s4, s5 and s6 applied to the peaking amplifier 300. The values of the control signals s1, s2, s3, s4, s5 and s6 for operating the transmitter at a given set of operating conditions can be stored directly in a decoded form as a set of one-bit values making up the operational parameters. Alternatively, the control signals can be stored in another form, e.g., an encoded form, and then converted to decoded signals s1, s2, s3, s4, s5 and s6 for application to the switching devices of the peaking amplifier 300.

Figure 4:
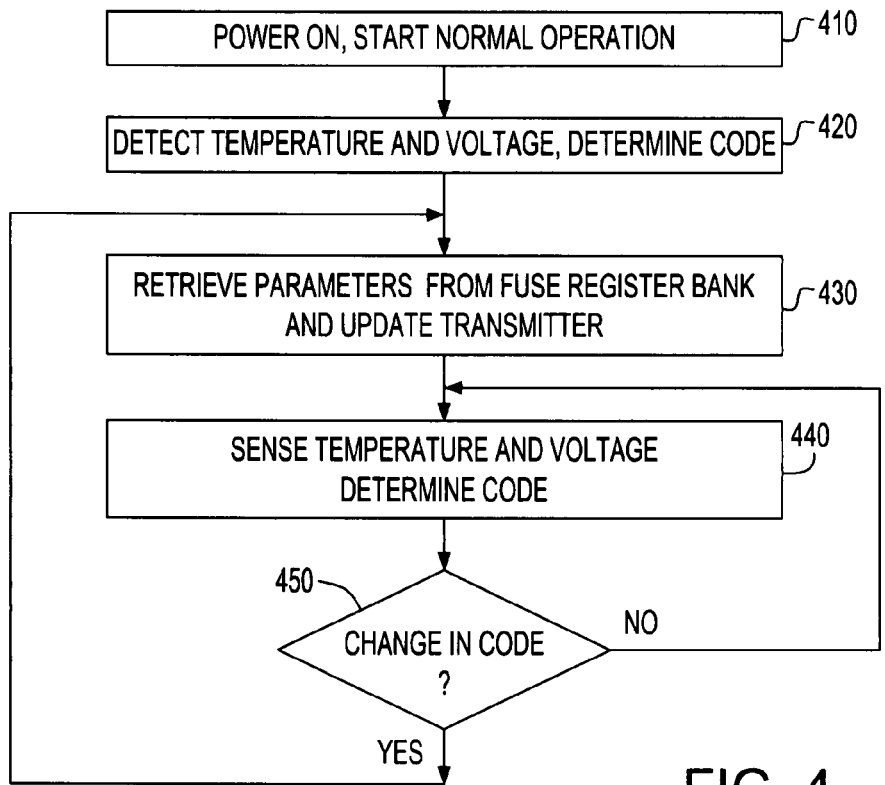
FIG. 4 is a flowchart illustrating a method of operation in accordance with an embodiment of the invention.

FIG. 4 is a flowchart illustrating an exemplary method for operating the transmitter and controlling its frequency response. In normal operation (block 410) of the transmitter, sensors, e.g., 205 (FIG. 2A) are used to detect an operating temperature and a level of a power supply voltage applied to the transmitter (block 420). From the detected temperature and voltage, a "code" is determined, as from a look-up table. From the code, in block 430 a set of operational parameters, e.g., values of control signals, such as signals s1, s2, s3, s4, s5, and s6 are retrieved from the parameter storage 220 (FIG. 2A). The peaking amplifier 300 (FIG. 3) of the transmitter is updated in accordance with the operational parameters. The transmitter now operates in accordance with the updated parameters. Subsequently (block 440), the temperature and voltage level are detected again using sensors 205 and the code corresponding to the detected values is obtained from the look-up table. The currently obtained code is then compared with the most recently used code. If the code has not changed, operation continues by monitoring temperature and voltage again from step 440. However, when the code has changed, operation continues at step 430 in which the new code is used to retrieve anew a set of operational parameters from the parameter storage 220 (FIG. 2A). The transmitter 202 then is operated in accordance with the newly retrieved set of parameters. Thereafter, operation continues by monitoring again the temperature and voltage (step 440).

The foregoing discussion assumes that operational parameters are already stored in the parameter storage 220 (FIG. 2A). The remaining description relates to ways of determining the operational parameters that are to be stored in the parameter storage 220.

In one embodiment, the operational parameters are determined with respect to samples of microelectronic elements in calibration tests at a production or test facility. Test conditions applied to the sample microelectronic elements are varied between minimum and maximum values for a matrix of n operating conditions. Samples having different design conditions such as different spacings between adjacent transmitters can be tested to determine matrices of n operating conditions for such samples, as well. Operational parameters for each set of operating conditions or design conditions can then be determined by applying initial operational parameters, testing the frequency response, changing the operational parameters if needed, and recording final operational parameters when the frequency response is satisfactory. The recorded final operational parameters are then provided as a set of data to be loaded into non-volatile memory, e.g., flash memory of the general population of chips which will be incorporated and used in an information handling system (e.g., processing or communication) system for use. Alternatively, the operational parameters can be stored by burning fusible links, e.g., fuses, antifuses, etc., on the general population of chips using electrical or laser equipment.

In another embodiment, the above-described calibration tests can be performed by built-in test algorithms which operate on each chip individually as installed in an information handling system for use. Here, it is possible that the calibration tests will cover a smaller set of operating conditions than the calibration tests done on samples as described above. For example, it may not be possible for the temperature or the power supply voltage level to vary by more than a small amount after the chip is installed in the information handling system. However, the range of variation of the operating conditions during calibration testing suffices because in operation, the range of variation is not exceeded.

In a particular embodiment, the bandwidth of the serial data transmitter is calibrated during a power-on-sequence for a plurality of different operating conditions. During the power-on-sequence, the transmitter is operated under a plurality of different operating conditions including different temperatures and power supply voltage levels. Settings applied to the peaking amplifier are adjusted for each set of operating conditions until the required frequency response is attained. The settings of the peaking amplifier are then stored as operational parameters for operating the transmitter.

Figure 5:
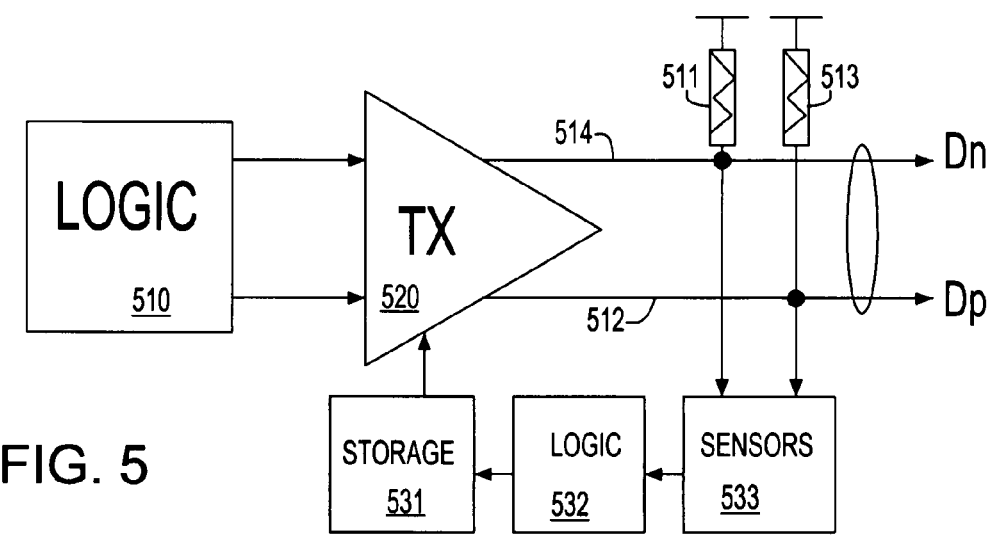
FIG. 5 is a schematic diagram illustrating operation of a microelectronic transmitter during a calibration method of operation in accordance with an embodiment of the invention.

FIG. 5 is a schematic diagram illustrating a system included within a microelectronic element 500 which is operable to calibrate a transmitter 520 under a plurality of different operating conditions. The system is used to record a set of operational parameters in storage 531 for controlling the transmitter's frequency response. The system can be utilized during a non-transmitting interval such as during or following a power-on-reset of the transmitter 520. The system includes transmitter control logic 510 operable to output a test data pattern for transmission by the transmitter 520. The control logic can output the test pattern at different transmission rates. The transmitter outputs a serial differential data signals Dn and Dp onto a pair of signal lines 514, 512, each of which is terminated by respective impedance matching networks 511, 513, for example, 50 ohm terminations.

Sensors 533 include a sensor which detects an operating temperature, a sensor which detects a power supply voltage level and sensors which detect an amplitude level of the differential data signals Dn and Dp present on the signal lines 514, 512. The output of the sensors 533 are supplied to logic circuits 532, which, in turn, are connected to parameter storage 531. As in the above example, FIG. 2A, the parameter storage 531 is coupled to the transmitter 520 to provide parameters for controlling its frequency response.

Figure 6:
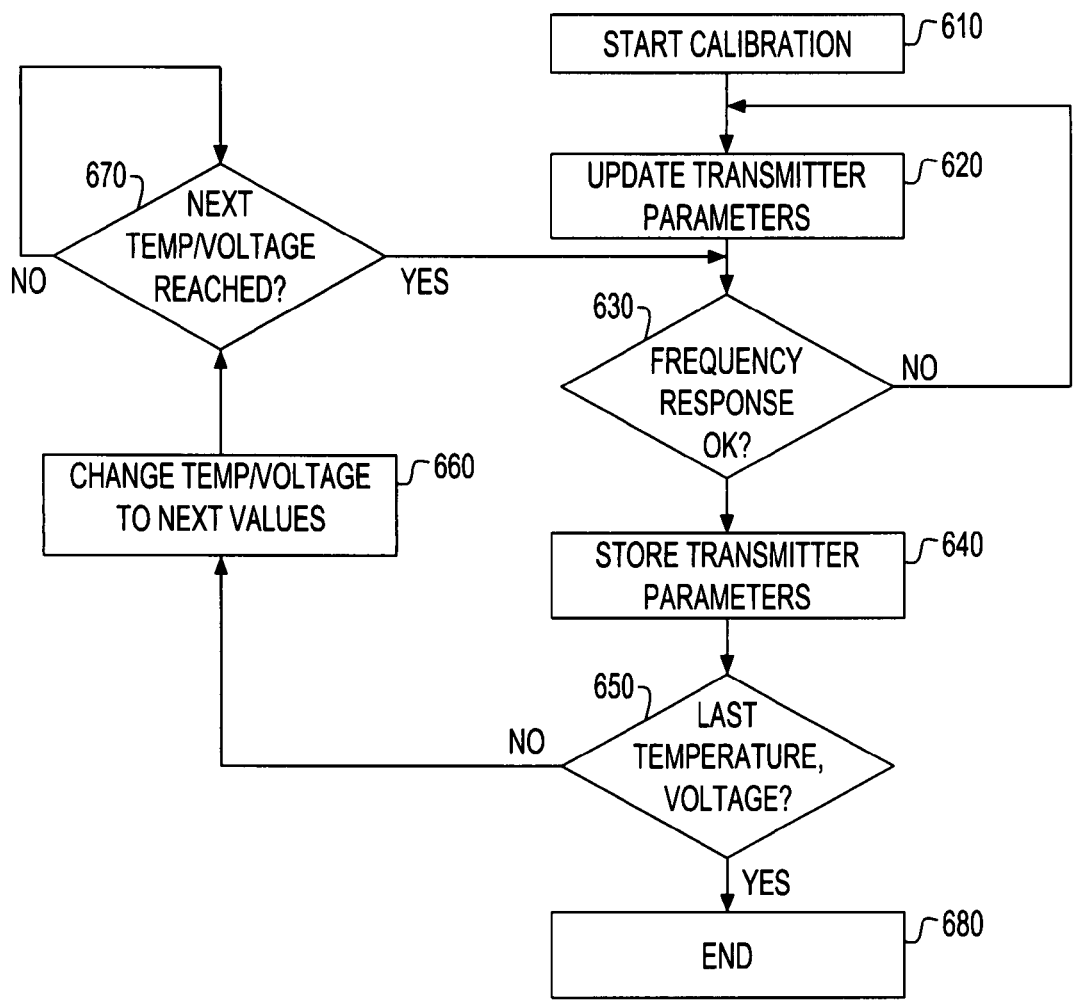
FIG. 6 is a flowchart illustrating a calibration method of operation in accordance with an embodiment of the invention.

FIG. 6 is a flowchart illustrating a method of calibrating a transmitter, e.g., transmitter 520 (FIG. 5), in accordance with an embodiment of the invention. When calibration begins (610), a set of operational parameters are retrieved (620) from storage and used to control the transmitter's frequency response. The transmitter is set to an initial condition for transmitting a data pattern at a particular data transmission rate. The transmitter also begins at a beginning temperature and beginning power supply voltage level. These conditions may be forced by circuitry on the chip or external circuitry. Alternatively, the different temperature and voltage conditions may occur as a result of the length of time the chip is operating since the chip was last powered on, with faster rises occurring in temperature when the chip has been recently powered on.

In one example, the retrieved parameters can be used to apply control signals s1, s2, s3, s4, s5, s6, etc., to a peaking amplifier 300 as illustrated in FIG. 3. The frequency response of the transmitter in transmitting the data pattern at the particular data transmission rate is then checked (630). If satisfactory, the operational parameters then are stored (640) as the valid parameters for use in controlling transmitter at the particular temperature, voltage and data transmission rate conditions. In block 650, it is checked to determine whether the calibration test has reached the last temperature and voltage conditions to be tested. If so, then the calibration test ends (680).

However, many different temperature and voltage conditions are to be tested. Step 660 represents a change in temperature and voltage conditions applied to the microelectronic element, which can occur by forcing, or by waiting for conditions, e.g., temperature, to change naturally, or by a combination of the same. Therefore, 670 represents a step of achieving the next temperature and power supply voltage condition, which may involve waiting, feedback control, or both to achieve. Once the next set of temperature and voltage conditions is achieved, the frequency response of the transmitter is checked again (630) and the above-described process of updating transmitter parameters and checking the frequency response is repeated until satisfactory frequency response is obtained under those temperature and voltage conditions. Then, the process repeats again for the next set of temperature and voltage conditions until the last set of conditions has been tested, at which time the calibration is complete (680).

Figure 7:
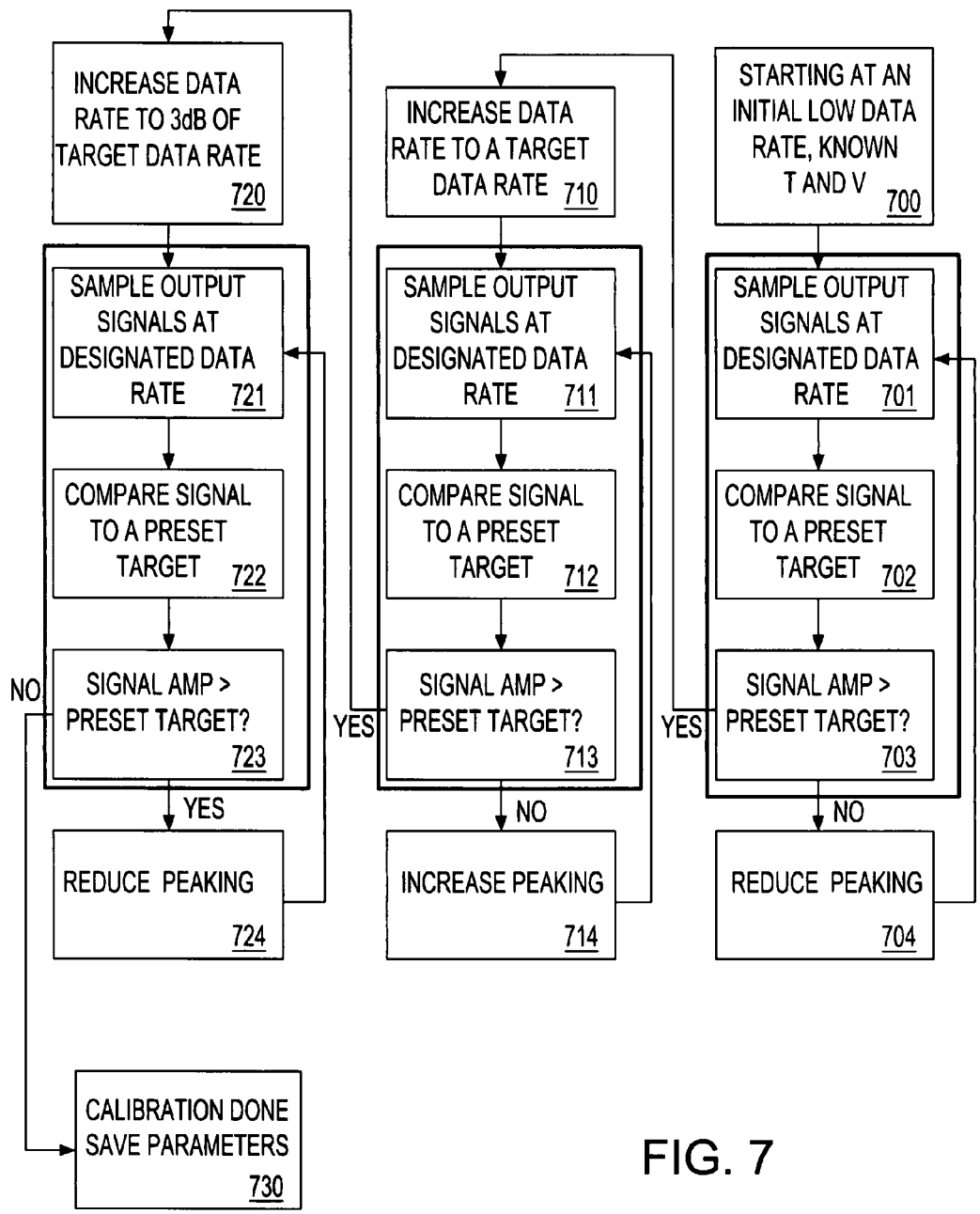
FIG. 7 is a flowchart illustrating a calibration method of operation in accordance with a particular embodiment of the invention.

FIG. 7 is a flowchart illustrating a particular method of calibration in accordance with an embodiment of the invention. The flowchart is read from right to left. Calibration testing begins by testing transmitter output signal amplitude using an initially low data transmission rate and known temperature and voltage conditions (700). In block 701, the output signals of the transmitter are sampled at the designated data rate. In block 702, the amplitude of each signal then is compared to a preset target amplitude, and in block 703, a decision is made whether the signal amplitude is greater than the preset target amplitude.

The performance of the method illustrated in FIG. 7 is best understood with reference to illustrative Bode plots of transmitter output signals (FIG. 8). As shown in FIG. 8, curve 881 represents a frequency response of the transmitter with no peaking or very little peaking applied. Curve 882 represents a desirable frequency response which is almost flat throughout the entire passband and does not show much decrease until above frequency f3, which can be considered the roll-off frequency. Curves 883 and 884 illustrate the signal amplitude under conditions of increased peaking. The increased peaking causes the signal amplitude at lower frequencies to fall well below the nominal amplitude a0, making these conditions undesirable for transmitting.

During this initial calibration test, the data rate is set to a low data transmission rate f1 (FIG. 8), such as a rate which is ⅕ of the normal peak data transmission rate $f_{max}$. Therefore, when the decision at block 703 is no, the signal amplitude at the lower frequency f1 is affected. Low signal amplitude at frequency f1 indicates that too much peaking is being applied to the transmitter. Therefore, under such condition, the amount of the applied peaking then is reduced (704). The amount of peaking then is reduced by reducing the value of the shunt capacitance (from among C1, C2 and C3; FIG. 3) connected between the legs of the peaking amplifier 300. Operation then continues again from step 701.

On the other hand, when the signal amplitude is greater than the preset target, operation then continues by increasing the data transmission rate (710) to the peak transmission rate $f_{max}$ (FIG. 8). With the new transmission rate, output signals are now sampled at the $f_{max}$ rate (711). The signal amplitude is compared to a preset target (712). If the signal amplitude is lower than the preset target, in this case, insufficient peaking is applied to the transmitter. Insufficient peaking is exemplified by curve 881 which begins rolling off before reaching $f_{max}$ and has lower signal amplitude at $f_{max}$. Therefore, when the signal amplitude is lower than the preset target, the amount of peaking is increased (714) and operation then continues at step 711.

Otherwise, when the signal amplitude is greater than the preset target, operation then continues by increasing the data transmission rate (720) to the f3 frequency (FIG. 8), a frequency which represents a designed passband limit of the transmitter in order for the transmitter to transmit at the peak rate of $f_{max}$. F3 is sometimes referred to as a "3 dB frequency", but it is not intended to require that signal amplitude at that frequency is reduced by 3 dB. Similar to the operations described above, the output signals are then sampled (721) at f3 rate, after which the signal amplitude is compared to a preset target (722). Then, when signal amplitude is greater than the preset target, it is presumed that the amount of peaking is too much, since the signal amplitude will more closely reflect curves 883 and 884 than curves 881, 882 (FIG. 8). Therefore, in such case, a decision is made to reduce the peaking (721) and then operation continues from step 721. Alternatively, when the signal amplitude is not greater than the preset target, then the amount of peaking is determined to be correct. In that case, further adjustment to the amount of peaking may not be necessary. In such manner, the correct amount of peaking is determined for the particular set of temperature and voltage conditions. The parameters determined for those conditions are then stored. The method may now continue for another set of temperature and voltage conditions.

In the performance of the above method (FIG. 7) it is believed that temperatures may be subjected to a wider changes than the voltage. It may also be difficult to tune the chip supply voltage during calibration. However, if one can vary the chip supply voltage by using a voltage regulator it is feasible to tune the bandwidth at different supply voltage levels. Temperature calibration alone may be sufficient. During the life of the chip, for each power supply voltage level, the chip has a capability of tuning the bandwidth of the transmitter at whatever the supply voltage it sees. In this way, the on-chip calibration system compensates for the aging process of the chip.

Figure 9:
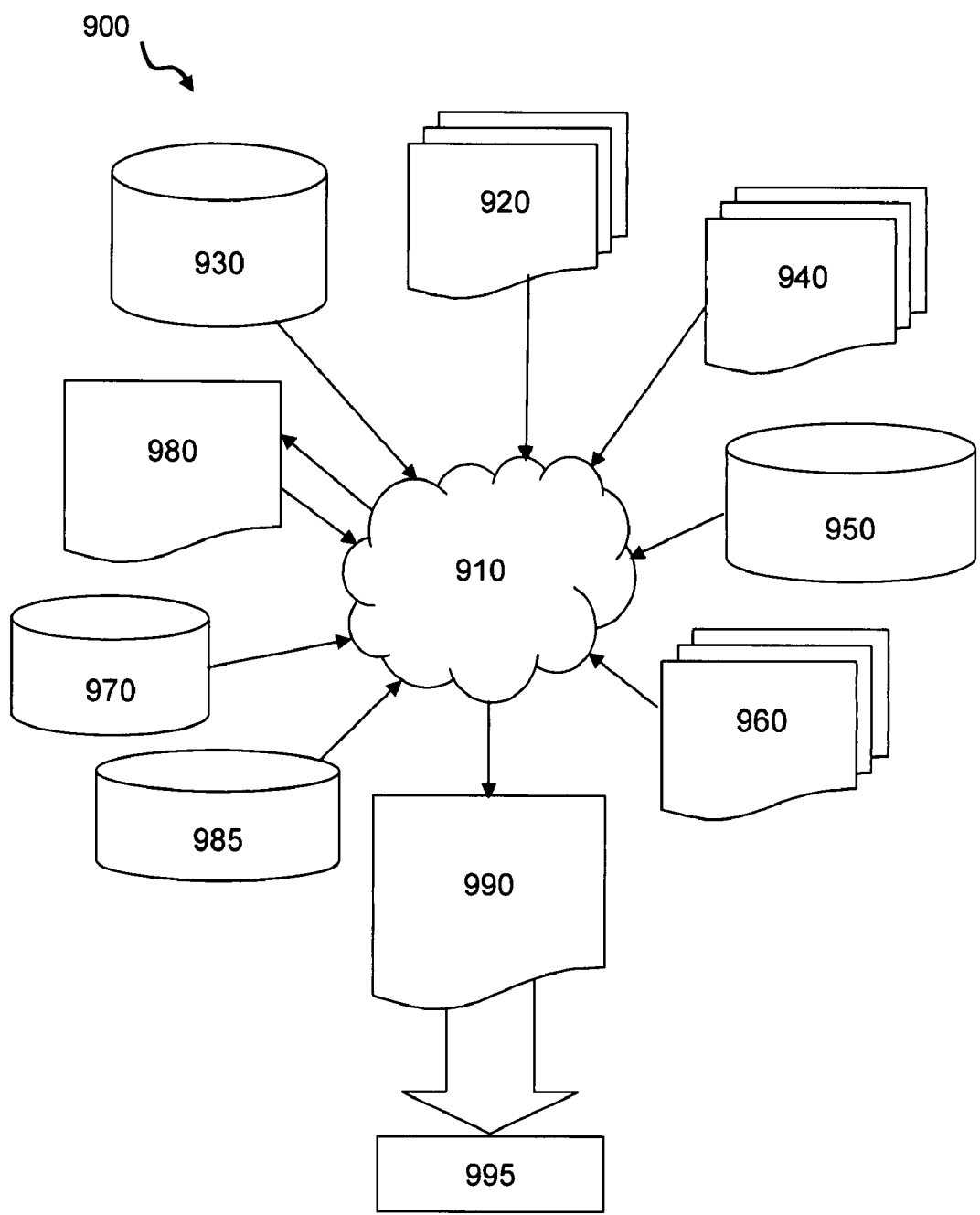
FIG. 9 is a block diagram of an exemplary design flow such as can be used in fabrication of a design structure in accordance with an embodiment of the present invention.

FIG. 9 shows a block diagram of an example design flow 900. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 can include a transmitter 200 of a microelectronic element (FIG. 2A) and other circuitry, e.g., 205, 210, 220 (FIG. 2A) in the form of schematics or HDL, a hardware-description language (e.g., Verilog, VHDL, C, etc.). Design structure 920 may be contained on one or more machine readable medium. For example, design structure 920 may be a text file or a graphical representation of the transmitter 200. Design process 910 preferably synthesizes (or translates) CMOS latch into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 2 through 7, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 2 through 7. Design structure 990 may then proceed to a stage 995 where, for example, design structure 990: proceeds to tape-out, is released to manufacturing, is released to a mask house, is sent to another design house, is sent back to the customer, etc.

While the invention has been described in accordance with certain preferred embodiments thereof, many modifications and enhancements can be made thereto without departing from the true scope and spirit of the invention, which is limited only by the claims appended below.

What is claimed is:

1. A design structure of a microelectronic element embodied in a machine-readable medium used in a design process, the design structure comprising:
   a transmitter having a frequency response capable of peaking and capable of adjusting peaking around a certain frequency range, and controllable in accordance with a plurality of operational parameters;
   a storage operable to store the plurality of operational parameters for controlling the frequency response of the transmitter under each of a plurality of operating conditions corresponding to the plurality of operational parameters;
   at least one sensor operable to detect one of the plurality of operating conditions; and
   a control circuit operable in response to a change in the detected operating condition to use one of the stored operational parameters corresponding to the detected operating condition to control the frequency response of the transmitter,
   wherein said frequency response is represented by a Bode plot for each of the plurality of operational parameters; wherein the plurality of operating conditions comprises values of variables including at least a temperature and a power supply voltage level; wherein the control circuit is operable to determine the operational parameters for the plurality of operating conditions when the transmitter is powered on from an off state; and wherein the transmitter is operable to transmit data serially over a cable external to the microelectronic element and the variables include at least one of (a) a length of a cable to which the transmitter is coupled to transmit output and (b) a data transmission rate for transmitting data by the transmitter.

2. The design structure as claimed in claim 1, wherein the detected operating condition includes a temperature of the microelectronic element and a power supply voltage level supplied to the microelectronic element.

3. The design structure as claimed in claim 1, wherein the transmitter includes an adjustable peaking element, wherein the control circuit is operable to apply the stored operational parameter to control a peaking function of the adjustable peaking element.

4. The design structure as claimed in claim 1, wherein the frequency response includes a passband limit represented by a 3-dB frequency, and the transmitter is capable of adjusting peaking around the 3-dB frequency.

* * * * *